Oct. 13, 1964
W. WITTE ETAL
3,152,674
FREE-WHEELING HUB
Filed Feb. 28, 1962
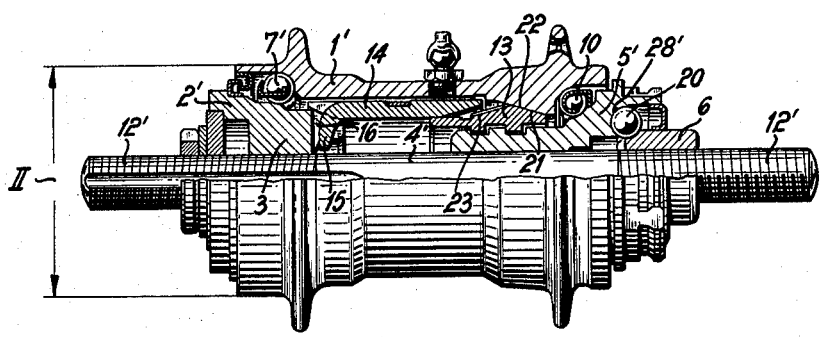
FIG. 2 PRIOR ART
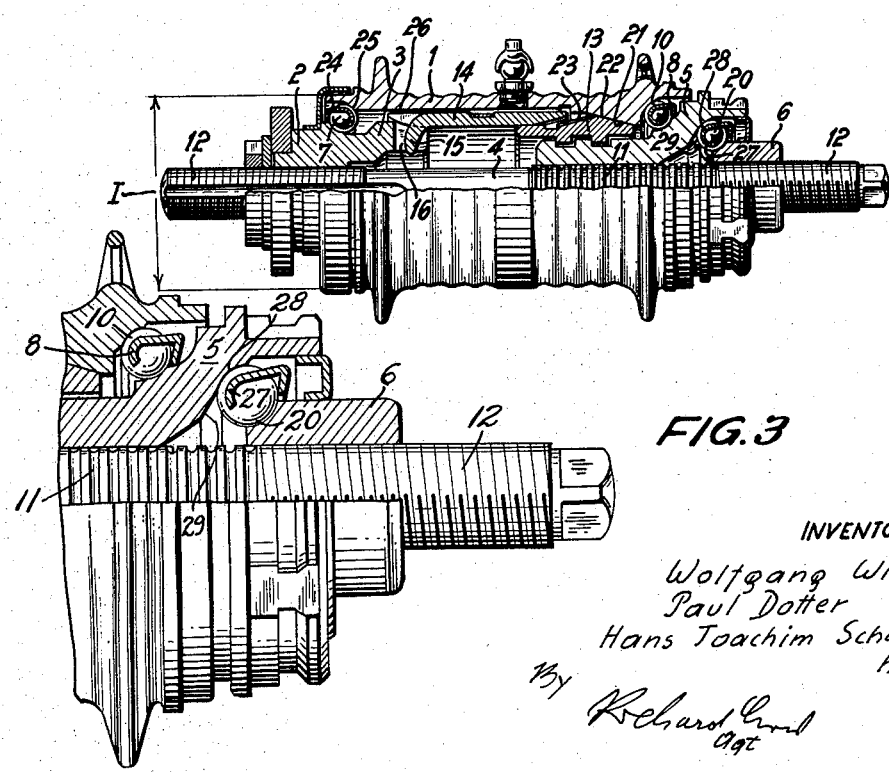
FIG. 1
FIG. 3
INVENTORS
Wolfgang Witte
Paul Dotter
Hans Joachim Schwerd-
höfer
By Richard Ernst
Agt United States Patent Office 3,152,674
Patented Oct. 13, 1964

3,152,674
FREE-WHEELING HUB
Wolfgang Witte, Paul Dotter, and Hans Joachim Schwerdhöfer, Schweinfurt (Main), Germany, assignors to Fichtel & Sachs A.G., Schweinfurt (Main), Germany, a corporation of West Germany
Filed Feb. 28, 1962, Ser. No. 176,340
Claims priority, application Germany Mar. 3, 1961
10 Claims. (Cl. 192—6)

This invention relates to a free-wheeling hub for bicycles and the like, and more particularly to a coaster hub, that is, a free-wheeling hub equipped with a coaster brake, such hubs being basically well known.

The cost of manufacturing coaster hubs on a mass-production basis is significantly affected by the methods employed in shaping the several constituent elements of the hub. Because of the low cost of thread rolling, it is preferred to roll the threads on the axial end portions of the hub shaft by means of which the shaft is secured on the frame of a bicycle or motorcycle. These threads also serve as attachments for bearing members interposed between the shaft and the anti-friction elements, such as the balls of a ball bearing, which in turn rotatably support the hub shell.

It is inherent in thread rolling that the external diameter of the rolled threads is greater than that of the shaft surface prior to rolling. It is customary to provide coaster hubs with a tubular driver member the cylindrical internal surface of which makes direct sliding contact with a portion of the shaft intermediate the threaded end portions, and usually adjacent one of these end portions. In order to permit assembly of the driver member with the shaft after thread rolling it has heretofore been necessary to machine the end portions of the shaft prior to thread rolling so that the outer diameter of the threads should not be greater than the original shaft diameter, and thus not greater than the internal diameter of the driver member. The necessary machining operation adds significantly to the cost of coaster hub manufacturing.

It is necessary that the bearing member adjacent the driver member be rather precisely positioned in an axial direction. It has been customary to provide the shaft with a shoulder or other abutment which limits the inward threaded movement of the bearing member on the shaft. This further increases production costs.

Another factor significantly affecting the effort and cost of bicycle hub manufacture is the amount of material employed. It is desirable both for the sake of appearance, and for lower cost to keep the weight and bulk of metal in the hub to a minimum. One reason for a relatively large diameter in conventional coaster hubs is the necessity of slipping a hub-shell supporting ball bearing over elements of the brake structure during hub assembly. The dimensions of the brake elements are substantially fixed for a desired brake effect. Conventional ball bearings supporting at least one end of the hub shell must have a larger internal diameter than the brake elements, and thus require a corresponding relatively large diameter of the hub shell.

The principal general object of this invention is a reduction in the manufacturing cost of coaster brake hubs without loss in quality or operating efficiency.

One of the more specific objects is the elimination of manufacturing steps considered necessary heretofore, or their replacement by other steps less costly, and capable of automation.

Another specific object is the reduction in the necessary size of a coaster hub.

Other objects and many of the attendant advantages of this invention will be readily appreciated as the same becomes better understood by reference to the following detailed description of a preferred embodiment when considered in connection with the accompanying drawing wherein:

FIG. 1 shows a coaster hub of the invention in an elevational view partly taken in section on an axial plane;
FIG. 2 illustrates a conventional hub of closely similar structure for better illustration of the novel features of this invention, the view of FIG. 2 corresponding to that of FIG. 1; and
FIG. 3 shows a detail of the coaster hub of FIG. 1 on an enlarged scale.

Referring now to the drawing and initially to FIGS. 1 and 3, there is seen a free-wheeling hub of generally conventional external appearance. The hub is mounted on a stationary shaft 4 the ends of which carry helical threads 12. The shaft may be installed in a bicycle frame and the like by inserting its ends into suitable recesses in the frame and by securing it on the frame by means of nuts (not shown) engaging the threads 12, as is conventional. The shaft 4 is enveloped by a hub shell 1 which is rotatable on the shaft and to which wire spokes (not shown) may be attached. A driver member 5 partly extends outside the shell 1, and it will be understood that a sprocket is to be secured on the driver member before the hub is installed in the bicycle. A chain may then be trained over the sprocket to rotate the driver member 5 in either one of two opposite directions for purposes which will become presently apparent.

The shaft 4 is a piece of a drawn cylindrical steel rod on which the threads 12 have been formed by rolling. As is evident from comparison of the illustrated threaded end portions 12 with a smooth central shaft portion having the original rod surface, rolling forms a helical groove in the rod and pushes the displaced material into a helical ridge the crest of which projects above the original rod surface so that the diameter of the threads is greater than the original rod diameter.

Adjacent the threads 12 which are near the driver member 5, that is, near the drive end of the shaft 4, corrugations 11 are formed on the shaft surface. These corrugations consist of axially alternating annular projections and recesses. They are also formed by rolling the shaft 4 in contact with a die so that the projections extend radially outward of the original rod surface. The outer diameter of the corrugations is slightly greater than that of the adjacent threads 12 so that the tubular driver member 5 may readily be slipped over the threads during assembly with the shaft 4. The corresponding internal diameter of the driver member 5 exceeds the external diameter of the corrugations by only as much as is necessary for free rotation of the member 5.

A tubular bearing member 6 has internal threads engaging the threads 12 adjacent the corrugations 11. The bearing member 6 is threaded on the threads 12 into abutting engagement with the first projection of the corrugations 11 which thus precisely defines the assembled axial position of the member 6.

The tubular driver member 5 has one axial portion which has the approximate shape of a hollow cone and flares continuously in a direction away from the other portion which is approximately cylindrical. This simple shape makes it possible to form the driver member by cold pressing with only minor secondary machining operations. The driver member thus is not only less expensive to manufacture than driver members produced by conventional methods, but can also be made very strong at low cost.

The cylindrical driver member portion rotates in direct contact with the projections of the corrugations 11. The outer cylindrical face of this portion engages a friction sleeve 13 by means of shallow square threads as will be discussed hereinafter. The bearing member 6 extends partly into the conical space 29 within the conical portion of the driver member 5. A ball bearing consisting of bearing balls 20 held in a cage 27 is interposed between the driver member and the bearing member 6. A shallow annular groove 28 in the conical internal face of the former provides a race sufficient to position the balls and to transmit to them the load of the wheel.

The drive end of the hub shell 1 is rotatably supported on the conical portion of the driver member 5 by means of a ball bearing consisting of balls 10 and a cage 8. Adjacent the last mentioned ball bearing, the hub shell 1 has an internal conical face 22 coaxial with the shaft 4. In the position of the hub illustrated in the drawing, the face 22 engages a matingly shaped external face 21 on the friction sleeve 13. The threads connecting the sleeve to the driver member 5 are inclined in such a direction that rotation of the driver member in the direction corresponding to forward movement of the bicycle urges the face 21 into frictional engagement with the face 22 and couples the driver member to the hub shell 1 for driven forward movement of the bicycle.

When the driver member 5 is rotated in the other direction, as during back-pedaling, the friction sleeve 13 moves axially on its internal threads in a direction away from the drive end of the shaft 4 and toward the other end which will be referred to hereinafter as the brake end.

The friction sleeve 13 has another conical face 23 which tapers toward the brake end. The face 23 is adapted to cooperate in a manner known in itself with a slotted brake sleeve 14 preferably made by roll shaping a sheet metal blank. Engagement of the face 23 with a conically tapered edge portion of the brake sleeve causes the sleeve to move axially toward the brake end of the hub and to expand radially. Such radial expansion is further actuated by engagement of the axially opposite edge of brake sleeve 14 with a conical portion 3 of another bearing member 2 threadedly mounted on the threads 12 of the brake end of the shaft 4. The portion 3 of the bearing member 2 is provided with the slots 16 in an axial plane into which inwardly projecting lugs 15 of the brake sleeve 14 extend to secure the sleeve against rotation about the shaft 4.

The bearing member 2 provides an internal race for a ball bearing consisting of balls 7 and a cage 24 which supports the brake end of the hub shell 1. It will be noted that the conical portion 3 of the bearing member 2 has an external diameter greater than that of the ball race on the member, and therefore greater than the inner diameter of the ball bearing, the latter diameter being determined by respective inwardly directed faces of the balls 7. An annular portion of the bearing member 2 adjacent the ball bearing race in a direction toward the brake end of the hub is of circular cross section having a diameter greater than that of the internal ball bearing race.

The hub shell 1 is formed with a part-toroidal groove 25 which provides an external race for the balls 7. The internal face 26 of the shell 1 extending from the race 25 toward the drive end of the shell is of uniformly cylindrical shape and provides a friction face for engagement with the brake sleeve 14 when the latter is expanded by movement of the sleeve 13 toward the brake end of the hub during back-pedaling. The friction face 26 thus is contiguously adjacent the bearing race 25. Engagement of the sleeve 14 with the friction face 26 frictionally couples the hub shell 1 to the shaft 4.

While the internal diameter of the ball bearing constituted by the balls 7 and the cage 24 in the assembled condition is smaller than the external diameter of the portions of the bearing member 2 adjacent the internal ball race on the latter member, the bearing is still capable of being assembled. The minimum internal diameter to which the cage 24 may be expanded when empty of balls 7 is greater than the external diameter of the conical portion 3 so that the empty cage may be slipped over the conical portion 3 until it is in operative position, whereafter the balls 7 are inserted. It is thus possible to make the bearing consisting of balls 7 and cage 24 identical in dimensions and otherwise with the bearing of balls 10 and cage 8 which supports the drive end of the hub shell 1 on the driver member 5.

Modifications of the hub illustrated in FIGS. 1 and 3 will readily suggest themselves to those skilled in the art on the basis of these teachings. The corrugations 11, for example, need not necessarily consist of annular projections and recesses, each forming a closed circle in a plane transverse of the shaft axis. The corrugations may consist of a helical thread different from the helical threads 12 so as to prevent threaded engagement between the bearing member 6 and the corrugations. The difference may reside in a different pitch, in different shape of the threads, or merely in an axially offset position of the corrugations 11 from the thread 12 on the drive end of the shaft 4 by a fractional multiple of the common pitch so that the helix of the corrugations 11 does not coincide with the helix of the thread 12. The corrugations 11 need not actually be of greater diameter than the threads 12. Limitation of the axial movement of the bearing member 6 is achieved when the external diameter of the corrugations 11 is at least greater than the pitch diameter of the threads on the bearing member 6. Any reduction in the external diameter of the corrugations 11 from the external diameter of the threads 12 will result in a clearance between the driver member 5 and the corrugations 11, and should thus be held to a minimum if it is present at all.

It has heretofore not been customary to provide the balls interposed between the driver member and a bearing member on the drive end of the hub shaft with a cage in the manner of the cage 27, yet this cage has an important function. It permits the groove 28 in the internal face of the driver member 5 to be extremely shallow without loss of precise positioning of the balls 20. The shallow shape of the groove 28 is capable of being produced by pressing whereas this is not possible with a shape in which the race conforms to the ball circumference over a relatively great arc as would be necessary in the absence of the cage 27.

FIG. 2 illustrates the known free-wheeling coaster hub with the improvement of which this invention is concerned. The known hub is closely similar to the hub of the invention in many aspects, and substantially unchanged elements have been designated by identical reference numerals. They do not require detailed description.

Those elements of the known structure which differ from corresponding elements of this invention have been provided with primed corresponding reference numerals. They include a hub shell 1' which differs from the shell 1 by its diameter under otherwise similar conditions. As is evident from comparison of the dimensions I and II, indicating the characteristic outer diameters of the hub shells respectively, the known hub shell 1' is at least 20 percent larger in diameter. The reasons for this difference will become apparent hereinafter.

The bearing member 2' on the brake end of the hub is shaped to provide an internal bearing race larger in diameter than the conical portion 3 so that the ball bearing 7' may be slipped over the conical portion during assembly. This requires the afore-mentioned greater diameter of the shell 1'. The bearing 7' is much larger in diameter than the bearing which includes the balls 10.

The shaft 4' has threads 12' on its end portions, but lacks corrugations for engagement with the driver member 5'. For the reasons mentioned above, it is necessary to reduce the diameter of the shaft end portions prior to rolling the threads 12'.

The groove 28' in the driver member 5' must provide a seating arc of more than 90° for the balls 26 in order to position them properly in the absence of a cage 27. The resulting shape of the member 5' cannot be conveniently produced by cold pressing.

The advantages of this invention reside mainly in the cheaper methods of manufacture which are consistent with the structural properties of the new free-wheeling hub and of its component parts. These advantages are achieved without loss in structural strength and without impairment of the operating efficiency of the hub so produced.

It should be understood, of course, that the foregoing disclosure relates to only a preferred embodiment of the invention, and that it is intended to cover all changes and modifications of the example of the invention herein chosen for the purpose of the disclosure which do not constitute departures from the spirit and scope of the invention set forth in the appended claims.

What we claim is:

1. A free-wheeling hub comprising, in combination:
   (a) a shaft having an axis and two axial end portions;
   (b) helical threads on one of said end portions;
   (c) a plurality of corrugations transverse of said axis on a portion of said shaft axially adjacent said one end portion;
   (d) an internally threaded tubular bearing member engaging the threads of said one end portion and axially abutting against one of said corrugations;
   (e) a tubular driver member coaxially rotatable on said shaft, said driver member having one axial end portion rotatably engaging said corrugations and another axial end portion;
   (f) annular anti-friction bearing means interposed between said bearing member and the other end portion of said driver member;
   (g) a hub shell substantially coaxial with said shaft and rotatable thereon;
   (h) motion transmitting means interposed between said shaft, said hub shell, and said driver member for transmitting rotation of said driver member to said hub shell when the driver member rotates in one direction relative to said shaft, and for frictionally coupling said hub shell to said shaft when said driver member rotates in the other direction;
   (i) helical threads on the other end portion of said shaft;
   (j) another internally threaded tubular bearing member threadedly engaging the threads of said other end portion, said other bearing member being formed with a ball race about said axis and having two portions of substantially circular cross section adjacent said ball race and spaced from said ball race in opposite axial directions,
      (1) said two portions of said other bearing member having respective external diameters greater than the smallest external diameter of said ball race;
   (k) a first ball bearing interposed between said driver member and said hub shell; and
   (l) a second ball bearing of substantially the same external diameter as said first ball bearing,
      (1) said second ball bearing being received in said ball race of said other bearing member and interposed between said other bearing member and said hub shell,
      (2) said second ball bearing essentially consisting of a substantially annular cage and a plurality of balls retained in said cage, the balls while retained in said cage defining the internal diameter of said ball bearing, said internal diameter being smaller than said external diameters of said adjacent portions of said other bearing member, and the internal diameter of said cage being greater than the external diameter of at least one of said two adjacent portions.

2. A hub as set forth in claim 1, wherein said corrugations are annular.

3. A hub as set forth in claim 1, wherein the external diameter of said corrugations is greater than the pitch diameter of said threads.

4. A hub as set forth in claim 1, wherein the external diameter of said corrugations is greater than the external diameter of said threads.

5. A hub as set forth in claim 1, wherein said corrugations include a plurality of axially successive annular projections, two axially adjacent projections defining an annular recess therebetween.

6. A hub as set forth in claim 1, wherein said other axial end portion of said driver member flares substantially continuously in a direction away from said one end portion of said driver member.

7. A hub as set forth in claim 1, wherein said motion transmitting means includes a first sleeve member threadedly movable on said driver member about said axis, said sleeve member having a coaxial substantially conical face portion; and said hub shell having a internal coaxial conical face portion engageable with the face portion of said sleeve member when said sleeve member threadedly moves on said driver member in said one axial direction.

8. A hub as set forth in claim 6, wherein said anti-friction bearing means includes a plurality of anti-friction elements, and cage means for retaining said elements in predetermined circumferentially spaced relationship in contact with said flaring end portion of said driver member.

9. A hub as set forth in claim 1, wherein said hub shell is formed with a ball race for engagement with said second ball bearing, said hub shell having an internal friction face contiguously adjacent said ball race thereof, said motion transmitting means including brake means secured to said shaft, and actuating means operatively connected to said driver member when the same rotates in said other direction for urging said brake means into engagement with said friction face.

10. A hub as set forth in claim 9, wherein said brake means includes a second sleeve member substantially coaxial with said shaft and capable of radial expansion, and said actuating means includes means responsive to movement of said driver member in said other direction for radially expanding said second sleeve member until the same engages said friction face, said second sleeve member being of rolled sheet metal.

References Cited in the file of this patent
UNITED STATES PATENTS

| | | |
|---|---|---|
| 761,577 | Bullis | May 31, 1904 |
| 882,159 | Morron | Mar. 17, 1908 |

FOREIGN PATENTS

| | | |
|---|---|---|
| 885,065 | Germany | Aug. 3, 1953 |